Figure 1:
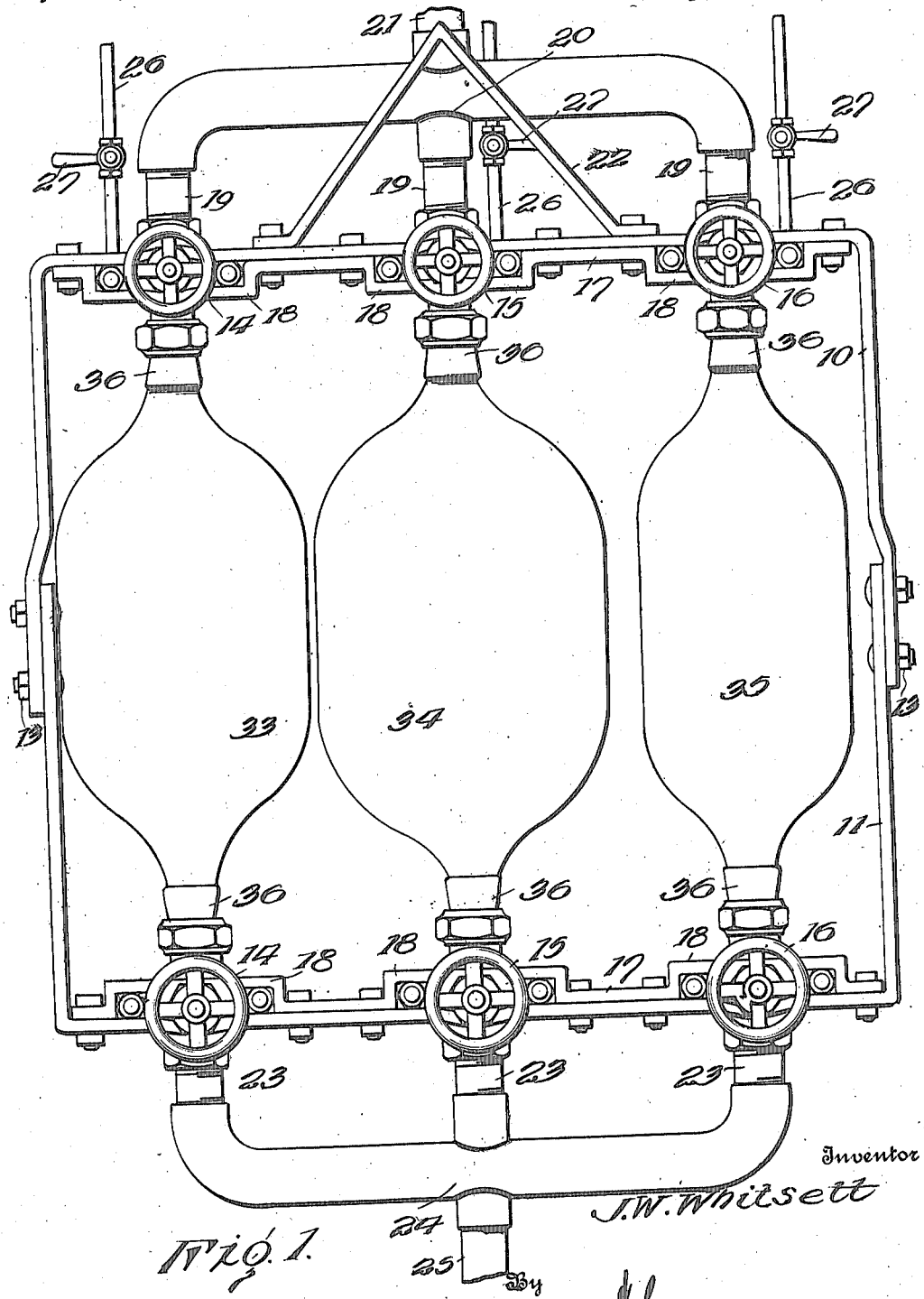

J. W. WHITSETT.
MEASURING DEVICE.
APPLICATION FILED JUNE 27, 1916.

1,233,737. Patented July 17, 1917.
2 SHEETS—SHEET 1.

Inventor
J. W. Whitsett

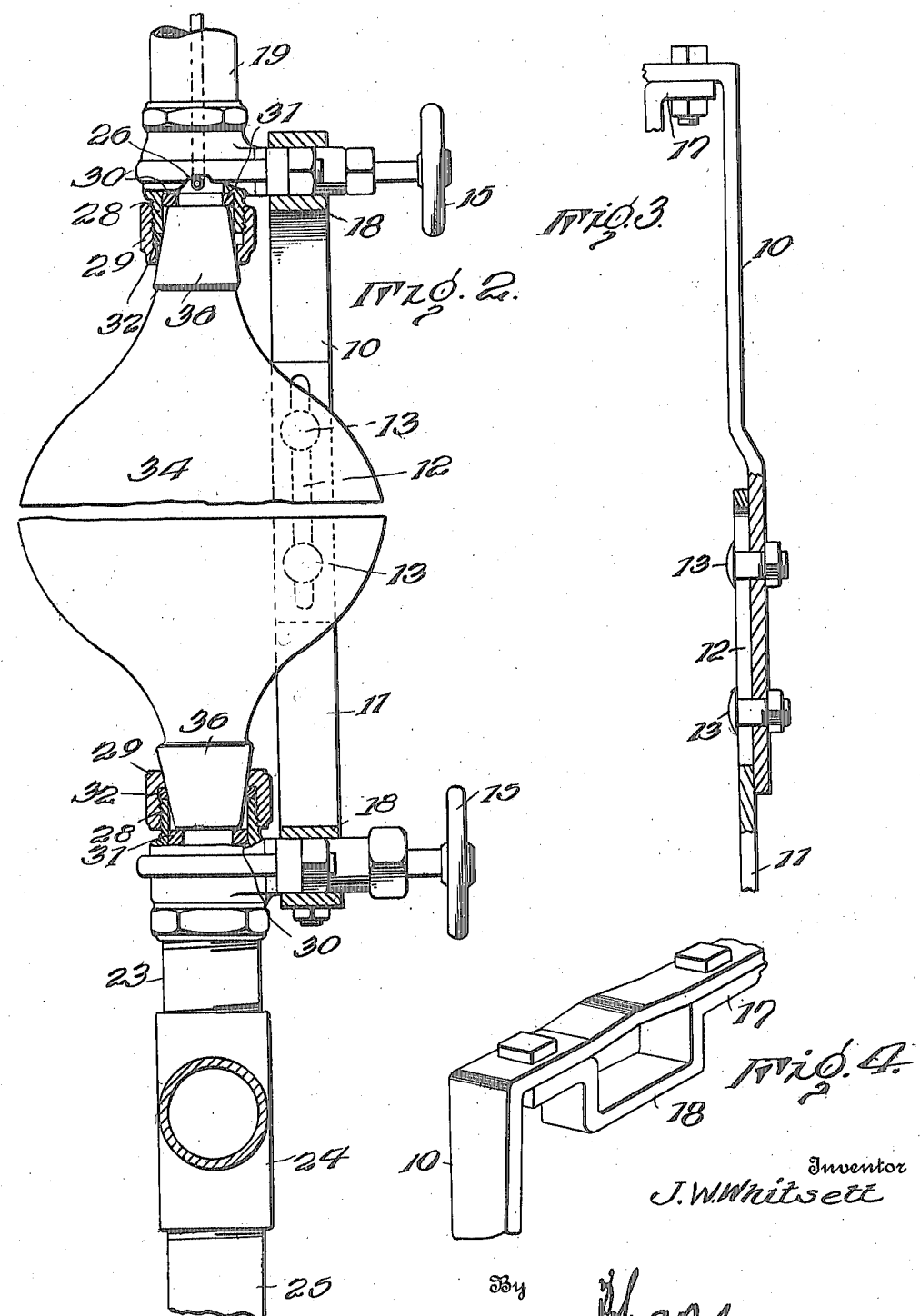

UNITED STATES PATENT OFFICE.

JAMES W. WHITSETT, OF BERKELEY, CALIFORNIA.

MEASURING DEVICE.

1,233,737.

Specification of Letters Patent.   Patented July 17, 1917.

Application filed June 27, 1916.   Serial No. 106,180.

*To all whom it may concern:*

Be it known that I, JAMES W. WHITSETT, a citizen of the United States, residing at Berkeley, in the county of Alameda and State of California, have invented certain new and useful Improvements in Measuring Devices, of which the following is a specification.

This invention relates to an improved measure especially designed for measuring gasolene at automobile service stations or garages.

The invention has as its primary object to provide a device of this character having transparent measures or measuring vessels and of such nature that the purchaser may see the proper measuring vessel filled with a desired quantity of gasolene before such gasolene is emptied into the tank of the vehicle of the purchaser so that the purchaser will thus be assured not only of obtaining pure gasolene but of obtaining the quantity thereof ordered.

The invention has as a further object to provide an improved device of this character employing measuring vessels of different capacities and so arranged that any one or all of the said vessels may be emptied for delivering different quantities of gasolene.

The invention has as a still further object to provide a device of this character wherein the measuring vessels will be connected by suitable pipes with a feed pipe and by similarly arranged pipes with a suitable discharge pipe with the said vessels mounted upon the supporting frame therefor so that it will be unnecessary to displace the vessels to either refill or empty the said vessels.

And a still further object of the invention is to provide an improved mounting for the measuring vessels so constructed that tight joints will be provided between the necks of the vessels and the valves associated therewith.

Other and incidental objects will appear as the description proceeds and in the drawings wherein I have illustrated the preferred embodiment of the invention and wherein similar reference characters designate corresponding parts throughout the several views:

Figure 1 is a fragmentary front elevation of my improved device particularly showing the arrangement of the measuring vessels upon the supporting frame therefor, Fig. 2 is a vertical sectional view more particularly showing the manner in which the measuring vessels are mounted, Fig. 3 is a fragmentary sectional view showing the adjustable connection between the sections of the supporting frame for the measuring vessels, and Fig. 4 is a fragmentary perspective view of one of the valve receiving loops of the supporting frame.

In carrying out the invention, I employ a rectangular supporting frame formed of sections 10 and 11. This frame is preferably formed of suitable metal strips and the sides of the section 11 adjacent the free ends thereof, are, as particularly shown in Fig. 3 of the drawings, provided with longitudinally extending slots 12. The sides of the section 10 adjacent the free ends thereof are offset to receive the free ends of the sides of the section 11 and carry bolts 13 engaging within the slots 12 for adjustably connecting the said sections. Mounted upon the supporting frame are pairs of oppositely disposed valves 14, 15 and 16 respectively arranged in transverse spaced relation upon the frame with corresponding uppermost valves carried by the sections 10 and corresponding lowermost valves carried by the section 11 of the frame. These valves may be of the gate or any other approved type and are connected to the transversely extending end members of the supporting frame by attaching strips 17 bent, at spaced points, into substantially U-shaped loops 18, as shown in Fig. 4 of the drawings, to embrace the valve shanks with the said strips connected to the supporting frame by bolts or other suitable fastening devices for rigidly supporting the valves in position. Preferably, the valves are each formed with a body having a stem secured thereto by a substantially U-shaped connecting member surrounding the valve body and extending through suitable sleeves upon the valve stem with the ends of the said connecting member receiving bolts adjustable to clamp the valve stem in position. The bolts of the clamping members of the several valves are, as particularly shown in Fig. 2 of the drawings, received between the loops 18 of the strips 17 and the ends of the frame sections 10 and 11.

Leading upwardly from the uppermost valves 14, 15, and 16, are pipes 19 connected by a cross union 20 into which is fitted a feed or supply pipe 21 connected with a suitable reservoir preferably located above the supporting frame. In this connection, it should be stated that the supporting frame may be erected in any suitable manner but is preferably suspended by a bracket 22 connected to the upper end of the frame. Leading downwardly from the lowermost valves 14, 15, and 16, are pipes 23 connected by a cross union 24 into which is fitted a discharge pipe 25. Fitted into the valve bodies of the uppermost valves below the gates of the said valves, as more particularly shown in Fig. 2 of the drawings, are air intake pipes 26 in which are interposed suitable valves 27.

The pairs of valves 14, 15, and 16 are, as more particularly shown in Fig. 2 of the drawings, respectively provided with confronting terminals 28 exteriorly screw threaded to receive gasket clamping and centering sleeves 29. At their inner extremities, the terminals 28 are internally formed with annular seats 30 upon which are mounted packing rings 31. The sleeves 29, adjacent the outer ends thereof, are flanged to receive packing ring 32 fixed upon the sleeves to move therewith.

Fitted into the confronting terminals of the pairs of valves 14, 15, and 16 are double ended transparent measures or measuring vessels 33, 34 and 35 respectively. These vessels are preferably formed of glass or other similar material and at the extremities thereof, are provided with reduced necks having annular tapered terminals 36. The terminals 36 are, as particularly shown in Fig. 2, received within the terminals 28 of the said valves to seat against the packing rings 31 with the sleeves 29 surrounding the terminals of the vessels and adjustable upon the valve terminals for urging the packing rings 32 carried by the said sleeves into engagement with the terminals of the vessel. Tight joints between the vessels and the pairs of valves 14, 15, and 16, are thus insured while, at the same time, the sleeves 29 also provide centering sleeves for the vessels acting upon the terminals 36 thereof to maintain the mouths of the vessels in proper coöperative relation with respect to the passages through the valves. In this connection, attention is directed to the fact that in mounting the vessels 33, 34, and 35 in position within the supporting frame, the sections of the frame may be moved away from each other when the lower terminals of the said vessels may be initially positioned in the lowermost valves 14, 15, and 16. The sections of the frame may then be adjusted upon each other by means of the bolts 13 for moving the uppermost valves 14, 15 and 16 into engagement with the upper terminals of the vessels. The sleeves 29 may then be adjusted for permanently connecting the vessels with the said valves. Thus, the measuring vessels may be easily arranged in position or, as occasion may demand, may be easily displaced from the supporting frame and it will be seen that in forming the frame of adjustably connected sections, all of the valves engaging with the measuring vessels may be moved to coöperate therewith simultaneously.

As illustrated in Fig. 1 of the drawings, the measuring vessels 33, 34 and 35 are of different sizes and are accordingly of varying capacity. The specific capacity of each vessel may, of course, be determined by exigency but for the purposes of the present description, I will designate the measure 33 as a two gallon measure, the measure 34 as a three gallon measure and the measure 35 as a one gallon measure. Assuming now that it is desired to fill the vessels, the lowermost valves 14, 15 and 16 are closed. The valves 27 of the air intakes 26 are also closed. The uppermost valves 14, 15 and 16 are then opened when gasolene will flow from the supply pipe 21 into the said vessels 34, 35 and 36. The uppermost valves are then closed when the gasolene within the vessels is ready to be delivered to the purchaser. Should the purchaser desire only one gallon of gasolene, the lowermost valve 16 associated with the vessel 35 is opened and the valve 27 of the air intake 26 associated with the said vessel is also opened. Gasolene will then flow from the vessel into the tank of the vehicle of the purchaser. The vessels 33 and 34 may each be similarly emptied to deliver either two gallons or three gallons of gasolene or all of the vessels may be emptied simultaneously to deliver their total capacity.

It will therefore be seen that as the gasolene is measured and delivered it may be easily inspected by the purchaser so that the purchaser will not only be assured of obtaining pure gasolene but will also be assured of receiving the quantity thereof purchased and preferably, the lowermost valves 14, 15 and 16 will be slightly larger than the corresponding uppermost valves so that the liquid within the measuring vessels will more readily empty therefrom. It will also be seen that while my improved device is particularly designed for measuring gasolene at automobile service stations or garages, the device is also adapted for use as a measure in various other situations.

Having thus described my invention, what I claim and desire to secure by Letters Patent is:

1. A device of the character described including a sectional frame arranged with the terminals thereof overlapping with the said frame sections adjustable upon each other, means connecting the said overlapping terminals of the frame sections, and holding the said sections at adjustment coacting oppositely disposed valves carried by the said frame sections respectively, and a measuring vessel mounted between the said valves and operatively connected with a supply pipe and with a discharge pipe.

2. A device of the character described including a supporting frame, coacting oppositely disposed valves carried thereby, attaching strips formed intermediate the ends thereof with loops fitting around the valve bodies with the said strips secured to the frame for connecting the said valves with the frame, the said valves being respectively connected with a supply pipe and with a discharge pipe, and a measuring vessel mounted between the said valves.

3. A device of the character described including coacting strips providing a frame, coacting oppositely disposed valves carried by the frame, a measuring vessel supported between the said valves to communicate therewith, a supply pipe communicating with one of said valves, a discharge pipe communicating with the other of said valves, and a hanger connected to one of said strips for suspending the frame.

In testimony whereof I affix my signature.

JAMES W. WHITSETT. [L. S.]